Nov. 15, 1955

T. O. SUMMERS, JR 2,723,568

SERVO MECHANISM

Filed May 12, 1951

THOMAS O. SUMMERS, JR.
INVENTOR.

BY R. E. Geangue

ATTORNEY

Nov. 15, 1955  T. O. SUMMERS, JR  2,723,568
SERVO MECHANISM
Filed May 12, 1951  6 Sheets-Sheet 2

THOMAS O. SUMMERS, JR.
INVENTOR.

BY R. E. Geanque
ATTORNEY

Nov. 15, 1955  T. O. SUMMERS, JR  2,723,568
SERVO MECHANISM
Filed May 12, 1951  6 Sheets-Sheet 3

THOMAS O. SUMMERS, JR.
INVENTOR.

BY  R. E. Geauque

ATTORNEY

Nov. 15, 1955  T. O. SUMMERS, JR  2,723,568
SERVO MECHANISM
Filed May 12, 1951  6 Sheets-Sheet 4
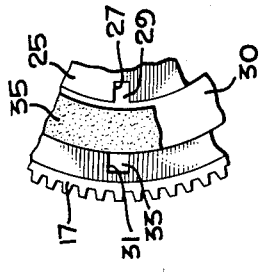
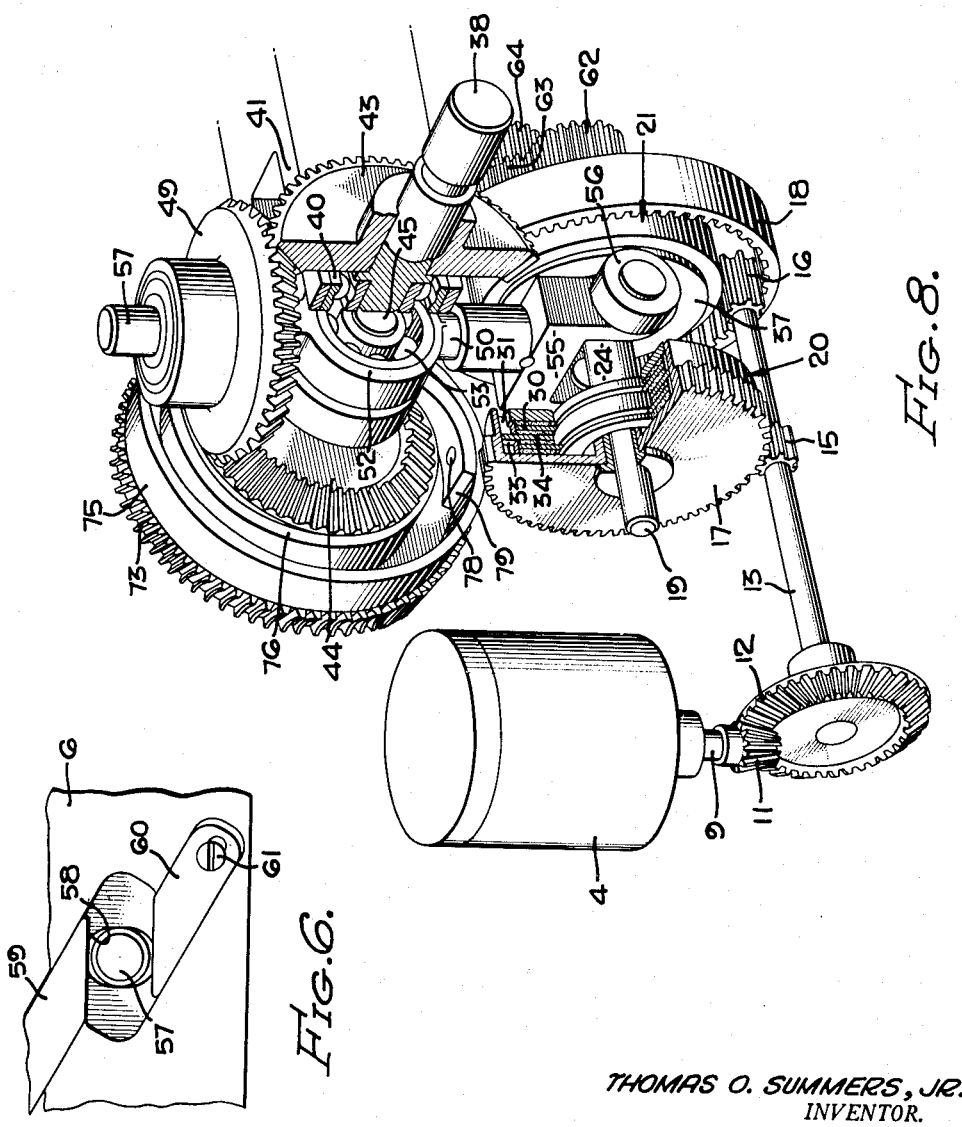
THOMAS O. SUMMERS, JR.
INVENTOR.
BY K. E. Geauque
ATTORNEY Nov. 15, 1955  T. O. SUMMERS, JR  2,723,568
SERVO MECHANISM
Filed May 12, 1951  6 Sheets-Sheet 5
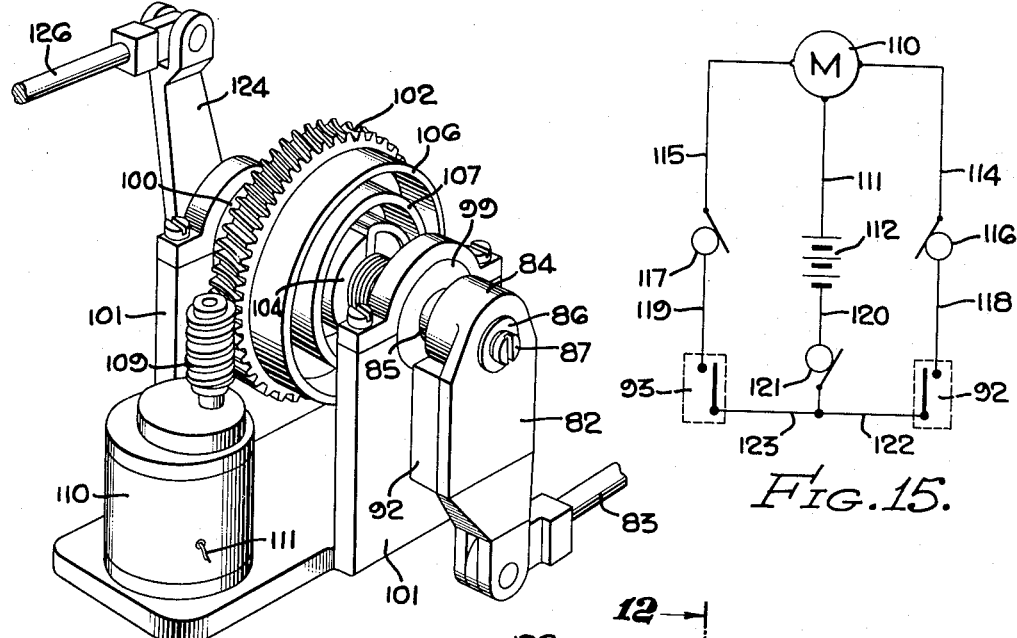
Fig. 9.
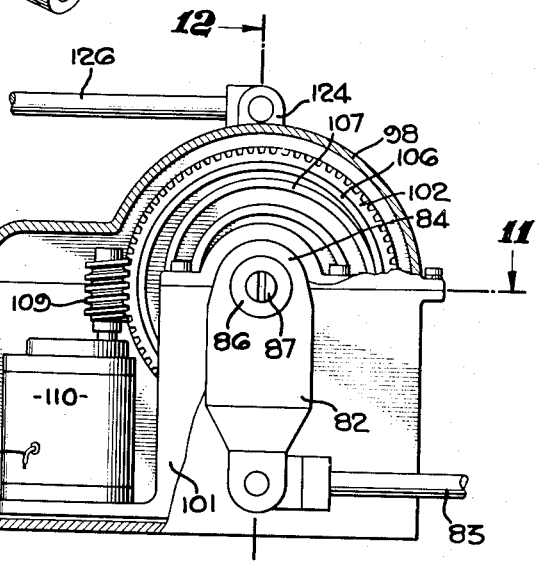
Fig. 15.
Fig. 10.
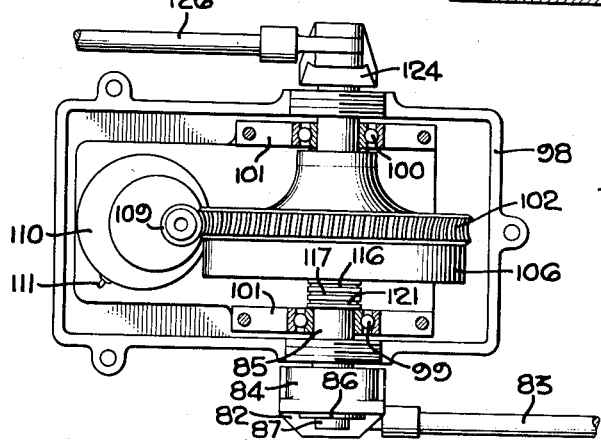
Fig. 11.
THOMAS O. SUMMERS, JR.
INVENTOR.
BY R. E. Geauque
ATTORNEY Nov. 15, 1955 T. O. SUMMERS, JR 2,723,568
SERVO MECHANISM
Filed May 12, 1951 6 Sheets-Sheet 6

THOMAS O. SUMMERS, JR
INVENTOR.

BY R. E. Jeanque

ATTORNEY

United States Patent Office 2,723,568
Patented Nov. 15, 1955

2,723,568

SERVO MECHANISM

Thomas O. Summers, Jr., Sherman Oaks, Calif.

Application May 12, 1951, Serial No. 225,995

8 Claims. (Cl. 74—388)

This invention relates to a servo mechanism, and more particularly to a servo which will maintain the control surfaces of an aircraft in various attitudes without the continuous exertion of pressure by the pilot against control stick.

The pilot usually finds it necessary to exert a continuous pressure against the control stick to hold the aircraft in a desired attitude and variations in the manually applied pressure will produce corresponding deviations of the aircraft from its desired attitude. The present invention contemplates the provision of a device for gradually reducing the stick force necessary to hold the aircraft in a desired attitude until it is no longer necessary for the pilot to exert an appreciable force against the control stick. A novel spring device has been incorporated in the invention so that any aerodynamic unbalance acting against the control surface will be equilibrated by the force of the spring and the control surface will be held in the desired position without attention or physical exertion on the part of the pilot.

It is therefore an object of this invention to provide a servo mechanism which can move a control element into position and then exactly counterbalance any force acting on the element in its new position.

A further object of the invention is to provide a novel control linkage whereby the control surface of an aircraft can be manually and accurately moved into any desired position by the pilot and then sufficient force applied to the control linkage to counterbalance the reaction forces developed on the surfaces.

Another object of the invention is to provide a novel spring for balancing the control linkage against the pressure acting on the control surfaces and a novel mechanism is provided for varying the force of the spring and the direction in which this force is applied.

These, and other objects of the invention, not enumerated above, will be clearly set forth in the following description and in the drawings in which:

Fig. 6 is a top plan view along line 6—6 of Fig. 3 illustrating the stops for the planetary gear.

Fig. 7 is a sectional view of one of the multiple disk clutches along line 7—7 of Fig. 4.

Fig. 8 is a perspective view of the automatic trim control device with the casing removed.

Fig. 9 is a perspective view of a modification of the invention which utilizes spaced electrical contacts for controlling the spring pressure.

Fig. 10 is a side elevation view of the modification of Fig. 9 showing the casing partly in section.

Fig. 11 is a top plan view along line 11—11 of Fig. 10 with a part of the casing removed.

Fig. 15 is a schematic wiring diagram for controlling the operation of the winding motor.

Figures 1, 2:
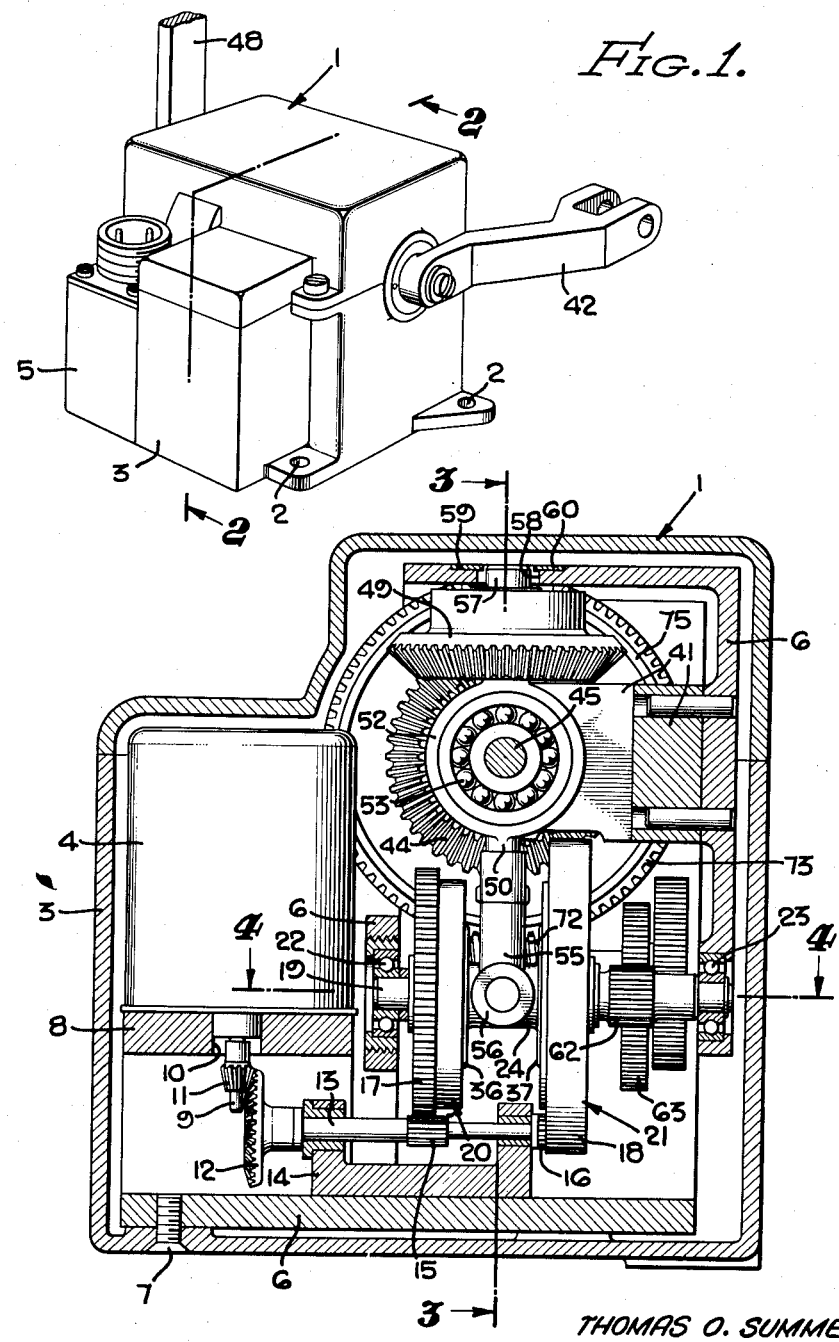
Fig. 1 is a perspective view in elevation of the automatic trim control device illustrating the input and output arms.
Fig. 2 is a cross-sectional view in elevation along line 2—2 of Fig. 1 illustrating the differential unit and the multiple disk clutches.

The embodiment of the invention illustrated in Figs. 1 through 8 comprises a divided casing 1 containing holes 2 for mounting the casing on the aircraft structure. The casing extension 3 houses the electrical motor 4 and casing extension 5 houses the electrical connection which supplies 24 volt D. C. to the motor. A second partial casing 6 is mounted inside divided casing 1 and attached thereto by screws 7. The casing 6 surrounds most of the mechanism of the invention and has sections which provide support for the components of the invention. Electric motor 4 is mounted on member 8 which is attached to partial casing 6. The shaft 9 of the motor extends through an opening 10 in member 8 and carries a small bevel gear 11 which cooperates with gear 12. Gear 12 is carried at one end of a shaft 13, which is rotatably mounted in member 14 attached to partial casing 6. Two small gears 15 and 16 are secured to shaft 13 and mesh with outside gear 17 and inside gear 18 respectively in order to rotate gears 17 and 18 in opposite directions. Gears 17 and 18 are rotatably mounted on shaft 19 and form sections of two multiple disk clutches 20 and 21 which are utilized to selectively drive the shaft (see Fig. 4). Sections of partial casing 6 retain bearings 22 and 23 which serve to rotatively mount shaft 19. Securely attached to shaft 19 by pin 24a is a cylindrical member 24 having enlarged ends 25 and 26 which are notched at 27 and 28 respectively. Each of the notches slidably receive extensions 29 of clutch plates 30 so that the clutch plates will rotate with member 24 and shaft 19. Gears 17 and 18 have notches 31 and 32 which slidably receive extensions 33 on clutch plates 34 so that the plates 34 will rotate with the gears. Positioned between the enlarged ends 25, 26 of member 24 and gears 17, 18 are friction rings 35 which serve to separate clutch plates 30 and 34 from one another and to separate clutch plates 30 from each of the gears. Also, slidably mounted between enlarged end 25 and gear 17 is metal pressure ring 36 which is separated by a friction ring 35 from one of the clutch plates 30. A similar metal pressure ring 37 is slidably mounted between enlarged end 26 and gear 18. Since gears 17 and 18 rotate in opposite directions, it is therefore apparent that when pressure is applied to ring 36, that gear 17 and clutch 20 will drive shaft 19 in one direction while if pressure is applied to ring 37, gear 18 and clutch 21 will drive shaft 19 in the opposite. The rotation of shaft 19 serves to adjust the force of a counterbalance spring as will be later described.

Figure 3:
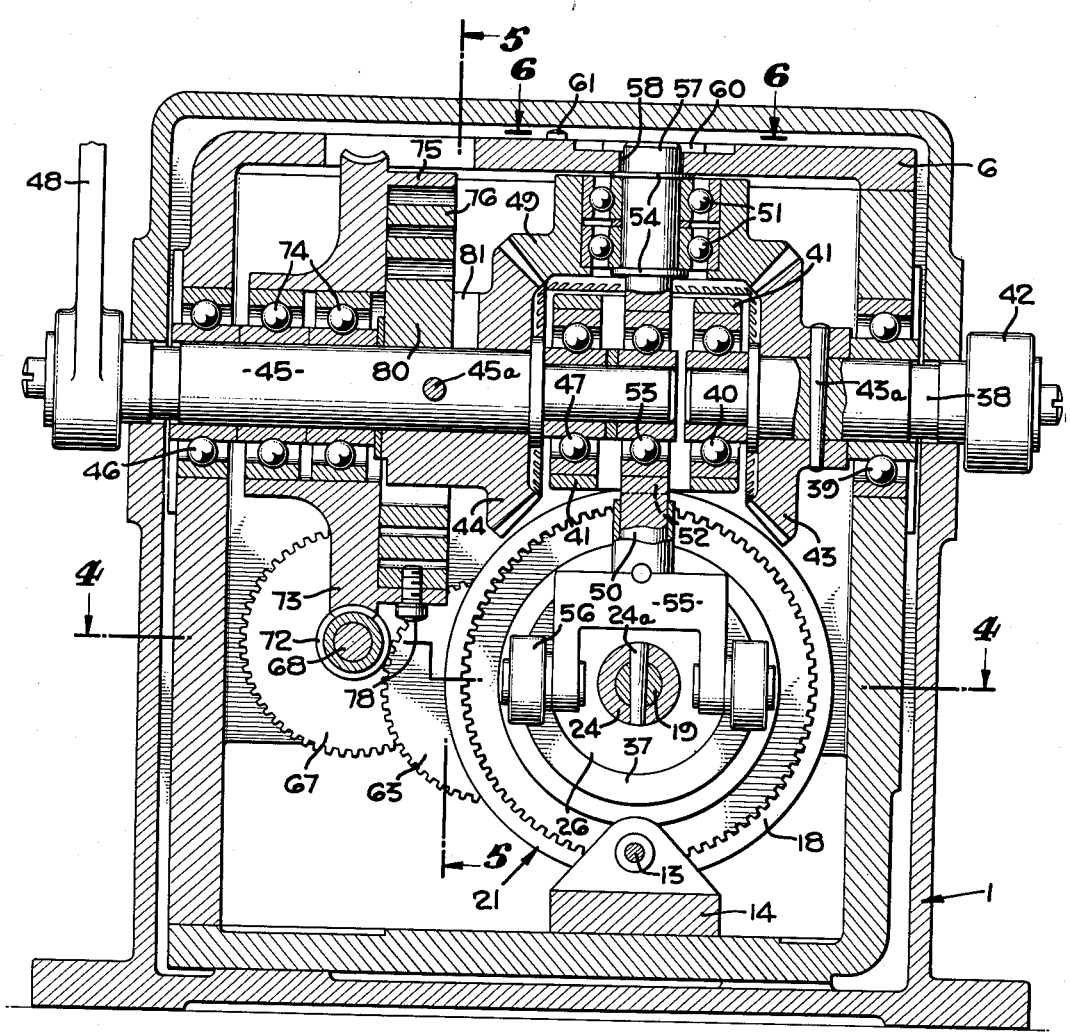
Fig. 3 is a cross-sectional view in elevation along line 3—3 of Fig. 2 showing the input and output shafts of the trim control device.

Referring to Fig. 3, an input shaft 38 is rotatively mounted by bearings 39 in partial casing 6 and by bearings 40 in extension 41 of partial casing 6. The input shaft 38 is connected to the control stick of the aircraft through link 42 and rigidly mounts differential gear 43 by means of pin 43a. A second differential gear 44 is secured by pin 45a to output shaft 45, which is rotatively supported by bearings 46 in partial casing 6 and by bearings 47 in extension 41 of partial casing 6. The output shaft 45 is connected to the control surfaces of the aircraft through link 48. A planetary gear 49 is rotatively supported upon shaft 50 by bearings 51 and shaft 50 contains an enlarged section 52 for retaining bearings 53 which serve to pivotally mount the shaft 50 on the end of shaft 45. Projections 54 on shaft 50 contact opposite sides of the inner race for bearings 51 and provide a means for maintaining planetary gear 49 in mesh with gears 43 and 44.

A U-shaped member 55 is attached to one end of shaft 50 and each arm of the U-shaped member mounts a roller 56. The rollers 56 are smaller in diameter than the distance between pressure rings 36 and 37 so that they will not contact either pressure ring when shaft 50 is approximately vertical. Also, the rollers are so spaced from one another that they contact opposite sides of either pressure ring when shaft 50 is rotated in one direction or the other. End 57 of shaft 50 projects through an oblong opening 58 in the top of partial casing 6 (see Fig. 6) and the casing is grooved to contain sliding plates 59 and 60 on either side of the opening. These plates are positioned relative to shaft end 57 by means of screws 61 so that the movement of shaft 50 will be limited to that required for the operation of clutches 20 and 21 by rollers 56.

Figure 4:
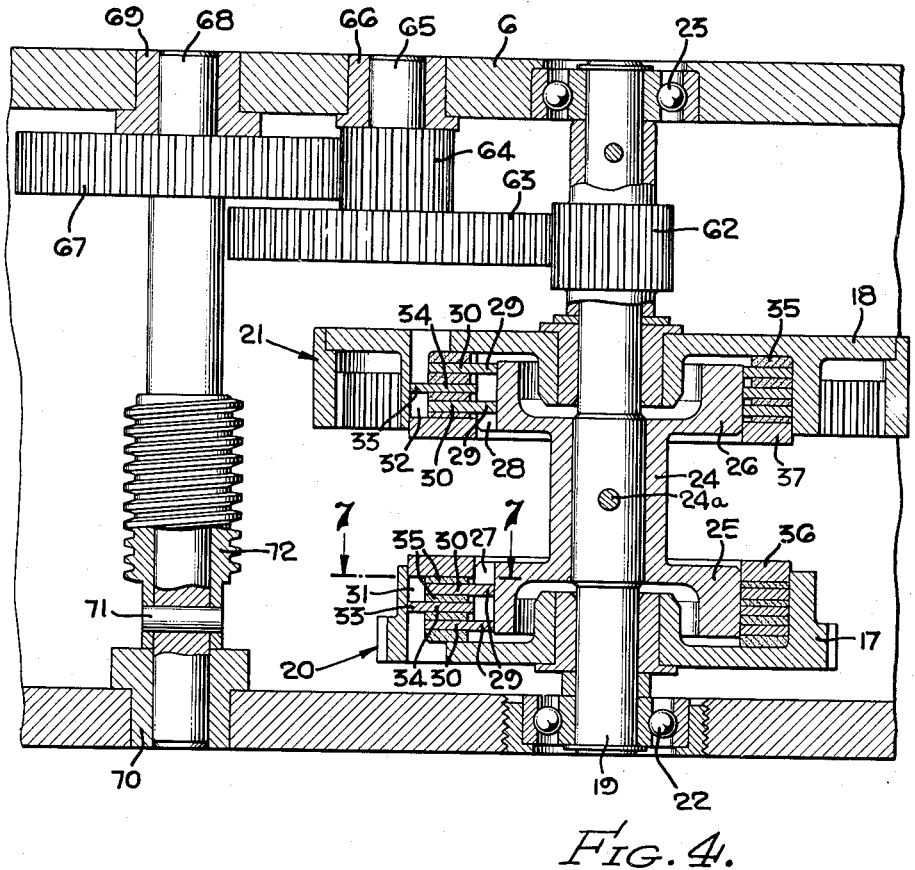
Fig. 4 is a plan sectional view taken along line 4—4 of Fig. 3 illustrating the multiple disk clutches.
Figure 5:
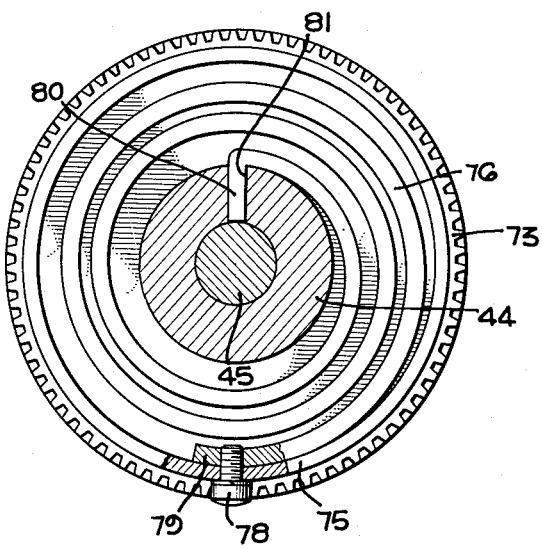
Fig. 5 is a side elevational view taken along line 5—5 of Fig. 3 showing the spring which balances the control surface forces.

Attached to shaft 19 is a gear 62 which drives gears 63 and 64 mounted on shaft 65 (see Fig. 4). The shaft 65 is rotatively supported in partial casing 6 by means of bushing 66. The gear 64 meshes with gear 67 which is attached to shaft 68. This shaft is mounted for rotation by bushings 69 and 70 positioned in partial casing 6. Rigidly attached to shaft 68 by pin 71 is a worm gear 72 which meshes with gear 73. The gear 73 is rotatively mounted on shaft 45 by ball bearing 74 and has a cylindrical projection 75 for receiving coil spring 76. A screw 78 serves to attach one end 79 of coil spring 76 to the projection 75 while the bent end 80 of the spring is positioned in slot 81 in the hub of differential gear 44. The bent end 80 of spring 76 is therefore restrained to move with shaft 45 while end 79 will move with gear 73 which is driven by worm gear 72.

It is therefore apparent that the spring 76 can exert a pressure in either direction on shaft 45, which is directly connected to the control surface and therefore receives the pressure acting upon the control surface. When the spring is wound up in the proper direction, it can be made to exert a force on shaft 45 which will counterbalance the air pressure exerted upon the control surface and then it will no longer be necessary for the pilot to exert a manual force on the control stick in order to maintain the surfaces in the required position to trim or turn the aircraft. It is understood that shaft 45 can be connected to either the aileron or the elevator of the aircraft so as to automatically trim the device either in roll or in pitch, or both.

The operation of the automatic trim device will now be explained in connection with Fig. 8. Prior to any movement of the control stick, the spring 76 normally acts against shaft 45 with whatever force is required to balance the pressure exerted on the shaft by the control surface, regardless of the position of the control surface. The pilot may find it necessary to manually move the control stick in order to move the shaft 38 counterclockwise and thereby position the control surface in a new position which will keep the aircraft in a desired attitude. The counter-clockwise movement of shaft 38 will first cause gear 43 to move pinion gear 49 bodily to the left until shaft end 57 strikes against plate 59. This movement of pinion gear 49 will also move rollers 56 against ring 37 so that motor 4 will drive shaft 19 through clutch 21. After the shaft end 57 strikes plate 59, further counter-clockwise movement of shaft 38 by the pilot will cause clockwise rotation of shaft 45 and of the control surface connected thereto. The pilot can therefore move the control surface in a clockwise direction to the new position required to keep the craft in a desired attitude. After the control surface has reached this new position, the pilot must continue to exert a force on the control stick until the motor 4, acting through clutch 21, rotates gear 73 a sufficient amount in the clockwise direction to exactly balance the force of spring 76 against the air pressure experienced by the control surface in its new position. When this balance condition is achieved, the gear 44 will be rotated enough to move the rollers 56 away from ring 37 and the motor 4 can then no longer adjust the force of spring 76 through clutch 21 and it will no longer be necessary for the pilot to exert a manual force on the control stick in order to keep the aircraft in the desired attitude.

The pilot may find it necessary to manually move the control stick to move shaft 38 in the clockwise direction and position the control surface in a new position which will maintain the aircraft in a desired attitude. The clockwise movement of shaft 38 will cause gear 49 to move bodily to the right until shaft end 57 strikes plate 60, at which time the rollers 56 will be pressing against ring 36 so that motor 4 will be driving shaft 19 through clutch 20. After the shaft end 57 strikes plate 60, further clockwise movement of shaft 38 by the pilot will cause counter-clockwise rotation of shaft 45 and of the control surface connected thereto. The pilot can therefore continue to move the control surface in a counterclockwise direction until a new position is reached which will keep the aircraft in the desired attitude. After the control surface has been positioned, it will be necessary for the pilot to continue to exert a pressure on the control stick until motor 4, acting through clutch 20, can rotate gear 73 a sufficient amount in the counter-clockwise direction to exactly balance the force of spring 76 against the air pressure acting on the control surface in its new position. When the spring 76 is properly balanced, the gear 44 will be moved sufficiently to move rollers 56 away from ring 36 and thereby disengage clutch 20 so that motor 4 can no longer adjust the force of spring 76. After motor 4 has ceased to adjust spring 76, the pilot will not have to exert a manual force on the control stick in order to hold the control surface in the position required to keep the aircraft in the desired attitude.

Regardless of whether the pilot moves shaft 38 in the clockwise or counter-clockwise direction to move the shaft 45 and the control surface counter-clockwise or clockwise to a new position, the force of spring 76 will be adjusted in the proper direction to counterbalance the air pressure on the control surface in its new position. Thereafter, any increase or decrease of air pressure on the surface, such as caused by air pockets, etc. will cause rollers 56 to move into contact with either ring 36 or 37 in order to drive gear 73 in the correct direction to adjust the force of spring 76 so that it will again exactly balance the new air pressure experienced by the control surface. This adjustment for changes in air pressure will be quickly accomplished so that the pilot will not have to exert an appreciable pressure upon the stick in order to hold the surface in its new position.

The modification shown in Figs. 9-14 will now be described. One end of control link 82 is connected to the control stick of the aircraft by rod 83 while the other end has an enlarged section 84 for receiving one end of shaft 85. The link 82 is retained on shaft 85 by washer 86 and screw 87 which passes through the link and is threaded into the center opening in shaft 85. An arced section 88 projects from the surface of shaft 85 into an opening 89 in enlarged section 84. The opening 89 is made slightly larger than the section 88 to provide a lost motion connection between link 82 and shaft 85. A pin 90 also extends from the shaft 85 through an opening 91 in section 84, which opening is large enough to allow for relative movement between the pin and the section 84.

A pair of micro switches 92 and 93 are carried by link 82 and have actuating pins 94 and 95 respectively which are positioned opposite each other. The spring arms 96 and 97 have one end secured respectively to switches 92 and 93 and project into the space between the switches so that the other ends of the spring arms are positioned on opposite sides of pin 90. The amount of relative motion allowed between shaft 85 and link 82 by the size of opening 89 is sufficient to allow pin 90 to move either of the spring arms against the corresponding actuating pin.

The shaft 85 extends through casing 98 and is supported by ball bearings 99 and 100 which are positioned in an inner support frame 101. A gear wheel 102 is positioned within casing 98 and is rotatably mounted on shaft 85 so that it can rotate relative to shaft 85. The gear wheel is confined between a ring 103 and disk member 104 which is secured to the shaft by means of a pin 105. A thin flange 106 projects from one side of the gear wheel and surrounds the disk member 104. Positioned within the flange is a coil spring 107 whch has one end secured to the inner surface of the flange by screw 108 and the other end secured in a slot in disk member 104 (see Fig. 12). The gear wheel 102 meshes with worm gear 109 which is driven by a reversible electric motor 110 mounted on frame 101.

A line 111 supplies D. C. current from a power source 112 to the reversible motor (see Fig. 15). The two separate fields of the motor are connected through junction box 113 and lines 114 and 115 to slip rings 116 and 117 respectively. Two lines 118 and 119, which extend along the interior opening of shaft 85, connect the slip rings 116 and 117 respectively with the micro-switches 92 and 93. The shaft 85 is grounded through lead 120, which connects slip ring 121 to the junction box 113, and switches 92 and 93 are grounded to the shaft 85 by leads 122 and 123 respectively.

The link 124 is rigidly secured to the end of shaft 85 by means of screw 125 so that the link will rotate with the shaft. The rod 126 connects the link 124 with the control surface of the aircraft in order to control the flight of the craft through movements of link 124.

Figure 12:
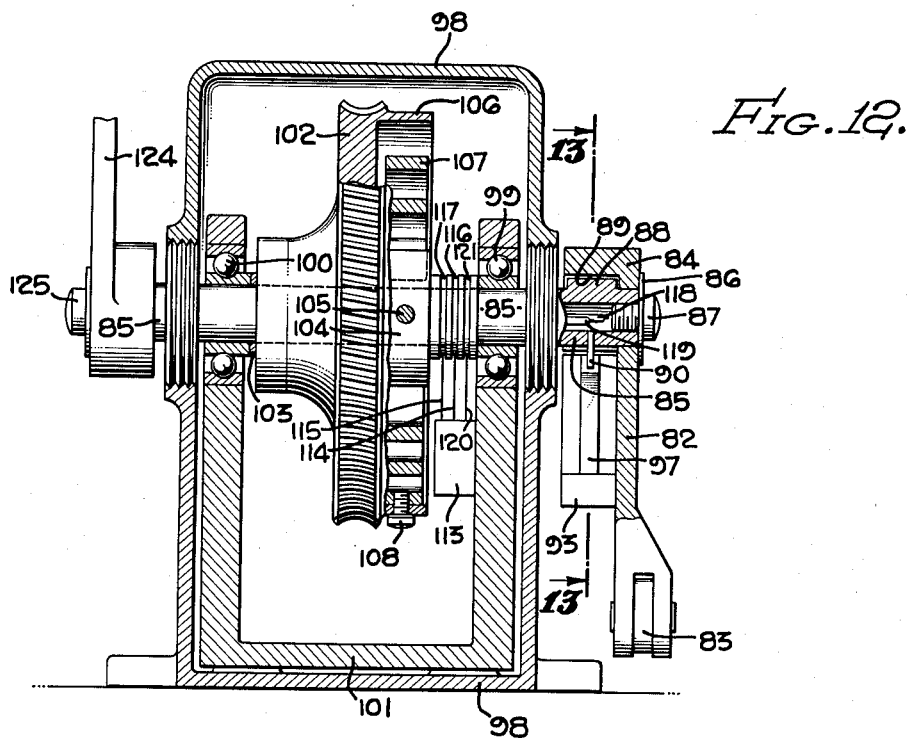
Fig. 12 is a cross-sectional view along line 12—12 of Fig. 10 showing the winding gear in elevation.
Figure 13:
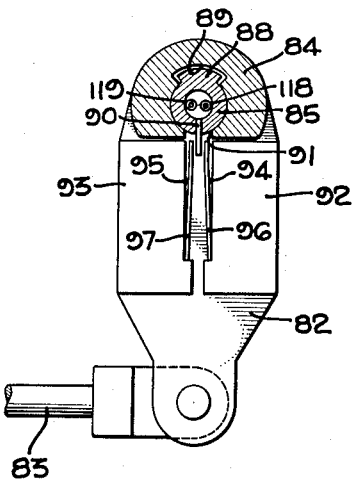
Fig. 13 is a cross-sectional view in elevation along line 13—13 of Fig. 12 illustrating the input arm connection.
Figure 14:
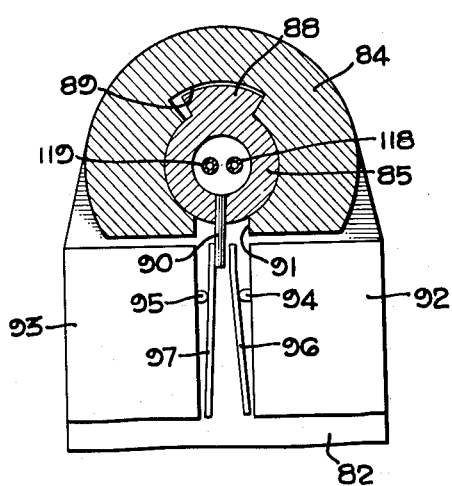
Fig. 14 is an enlarged view of Fig. 13 showing in detail the electrical contacts for controlling the winding motor.

The operation of the modified form of the invention can best be described in connection with Fig. 12. If the pilot rotates link 82 in the clockwise direction in order to place the control surface in a new position required to hold the aircraft in a desired attitude, the link 82 will rotate with respect to shaft 85 until section 88 contacts the side of opening 89. This small relative rotation will be sufficient for pin 90 to move spring arm 97 against actuating pin 95 and thereby close micro switch 93. The motor 110 will then start to drive worm gear 109 and gear wheel 102 will be rotated in the clockwise direction to adjust the force of spring 107. Additional rotation of link 82 will cause shaft 85 and the control surface attached thereto to rotate in the clockwise direction until the pilot has manually moved the control surface into the new position required to maintain the craft in the desired attitude. After the control surface has been placed in its new position, the pilot must continue to exert a manual force on the control stick until motor 110 has rotated gear 102 a sufficient amount in the clockwise direction to exactly balance the force of spring 107 against the air pressure experienced by the control surface in its new position. At the time the force of spring 107 has been properly balanced, the pin 90 will move out of contact with arm 97 and open micro switch 93 in order to stop motor 110.

If the pilot rotates link 82 in the counter-clockwise direction in order to place the control surface in a new position required to hold the aircraft in a desired attitude, the link 82 will first rotate with respect to shaft 85 until section 88 strikes the side of opening 89, at which time the pin 90 will have moved spring arm 96 against actuating pin 94 to close switch 92. When switch 92 is closed, the motor 110 will start to drive gear 102 in the counter-clockwise direction in order to adjust the force of spring 107. Additional rotation of link 82 in the counter-clockwise direction will cause shaft 85 and the control surface attached thereto to rotate in the counter-clockwise direction until the pilot has manually moved the control surface into the new position required to maintain the craft in the desired attitude. After the control surface has been positioned, the pilot must continue to exert a manual force on the control stick until motor 110 has rotated gear 102 a sufficient amount in the counter-clockwise direction to exactly balance the force of spring 107 against the air pressure experienced by the control surface in its new position. At the time the force of spring 107 has been properly balanced, the pin 90 will move out of contact with arm 96 and micro switch 92 will be opened to stop motor 110.

Regardless of whether the pilot moves link 82 in the clockwise or counter-clockwise direction to position the control surface, the force of spring 107 will be adjusted in the proper direction to exactly counterbalance the air pressure on the control surface in its new position. Thereafter, any increase or decrease of air pressure on the control surface, such as caused by air pockets, etc., will cause pin 90 to move into contact with either spring arm 96 or 97 and thereby cause motor 110 to drive gear 102 in the correct direction to adjust the force of spring 107 so that it will again exactly balance the new air pressure experienced by the control surface. This adjustment for changes in air pressure will be quickly accomplished so that the pilot will not have to exert an appreciable pressure on the control stick in order to hold the surface in its new position.

From the description, it is apparent that the novel spring device of this invention can be utilized to maintain the control surface of an aircraft in any position required to keep the aircraft in a desired attitude. The spring device is a means of relieving the pilot of the manual exertion usually required to hold the control surface in a given position. In general, the servo mechanism of this invention can be utilized in connection with the positioning of any machine element when forces are encountered by the element similar in nature to the aerodynamic forces experienced by an aircraft control surface. Various modifications of the invention are contemplated and may obviously be resorted to by those skilled in the art, without departing from the spirit and scope of the invention, as hereinafter defined by the appended claims.

What is claimed is:

1. In a servo mechanism, a manually movable input member, and output member receiving an external pressure which varies with the position of the output member, force applying means for normally counterbalancing the external pressure on said output member regardless of its position, a pinion gear connecting said output member to said input member for positioning thereby, said pinion gear being mounted for displacement of its axis by movement of either of said member, stop means for limiting the bodily movement of said pinion gear axis by said input member so that said output member can be moved by said input member, power means connected to said force applying means for adjusting its force on said output member, reversible clutch means interposed between said power means and said force applying means and means connected to said pinion gear and responsive to said bodily movement of said pinion gear axis for actuating said clutch means so that said power means will adjust said force applying means to counterbalance the external pressure acting on said output member after being moved by said input member.

2. In a servo mechanism, a first member movable by a control force, a second member positioned by said first member, said second member receiving an external force which varies with the position of said second member, connecting means between said members comprising a projection on said second member and an opening in said first member for receiving said projection, said opening being slightly larger than said projection to allow for a small amount of relative displacement between said members prior to movement of said second member by the force applied to said first member, and force applying means responsive to said relative displacement for applying a force to said second member equal and opposite to the external force experienced by said second member.

3. In a servo mechanism, an input member movable by a control force, an output member positioned by said input member, said output member receiving an external force which varies with the position of said output member, connecting means between said members allowing for small relative displacement between said members prior to movement of said output member by the force applied to said input member, a pair of micro switches positioned on said input member, and a pin carried by said output member, said pin positioned to actuate one or the other of said micro switches depending upon the direction of said relative displacement, a reversible electric motor connected with said switches, said motor being rotated in one direction by actuation of one of said switches and being rotated in the opposite direction by actuation of the other of said switches, and force applying means connected with said output member and driven by said electric motor in the proper direction to counterbalance said output member against the external force and to eliminate the relative displacement between said members resulting from movement of said output member by said input member.

4. In a servo mechanism, an input member and an output member movable by said input member, said output member receiving an external force which varies with the position of said output member, connecting means between said members comprising a projection on said output member and an opening in said input member for receiving said projection, said opening being slightly larger than said projection to allow for a small amount of relative movement between said members prior to movement of said output member by the force applied to said input member, switch means positioned on said input member and actuated by a pin carried by said output member upon relative movement of said members, a spring attached to said output member to exert a force on said output member, and power means actuated by said switch means for adjusting the force of said spring to exactly counterbalance the external force experienced by said output member.

5. A servo mechanism comprising in combination a first rotatable member, a second member rotatable by said first member, a connection between said members allowing for an angular displacement of said first member relative to said second member prior to the movement of said second member by said first member, coil spring means positioned around said second member and having its inner end connected thereto, power means connected to the other end of said coil spring means and rendered effective upon said angular displacement between said members to adjust the force of said coil spring means on said second member until said force is equal and opposite to the external force experienced by said second member after movement by said first member, said power means being rendered ineffective when the external force on said second member is counter-balanced and said angular displacement between said members is removed by said spring force.

6. A servo mechanism comprising in combination a first member, a second member rotatable by said first member in either the clockwise or counterclockwise direction, said second member experiencing an external force varying with its position, connecting means between said members allowing a small angular displacement therebetween prior to rotation of said second member by said first member, movable means rotatable relative to said second member by a power means, a coil spring concentric with said second member and having one end secured to said second member and the other end secured to said movable means, and means responsive to said small angular displacement of said members for rendering effective said power source to rotate said movable means until the force of said spring is equal and opposite to the external force on said second member.

7. A servo mechanism comprising in combination a first rotatable member, a second rotatable member positioned by said first member, a connection between said members allowing for a displacement of said first member relative to second member prior to rotation of said second member by said first member, a third member concentric with said second member and mounted for rotation relative to said second member, coil spring means connected between said third member and said second member and power means rendered effective by the relative displacement of said first and second members for rotating said third member relative to said second member to adjust the force of said spring means on said second member.

8. In a servo mechanism, a first member, a second member movable by said first member, said second member receiving an external force which varies with the position of said second member, connecting means between said members comprising a differential having one gear secured to each of said members and a pinion coacting with said gears, said pinion being mounted for displacement of its axis by movement of either of said members, stop means positioned to permit only a small displacement of said axis by said first member prior to the positioning of said second member by said first member, means connected to said second member for applying a force to said second member to counterbalance the external force on said second member and move said pinion axis away from said stop means, and means responsive to the displacement of said pinion axis by said first member for rendering effective said force applying means.

References Cited in the file of this patent

UNITED STATES PATENTS

| | | |
|---|---|---|
| 1,339,332 | Greenley | May 4, 1920 |
| 1,854,941 | Kiel | Apr. 19, 1932 |
| 2,330,569 | Esnault-Pelterie | Sept. 28, 1943 |
| 2,445,900 | Wiseman | July 27, 1948 |
| 2,522,284 | Lecarme | Sept. 12, 1950 |
| 2,583,828 | Gerstenberger | Jan. 29, 1952 |
| 2,604,613 | Klass | July 22, 1952 |
| 2,609,165 | Hill | Sept. 2, 1952 |
| 2,623,717 | Price | Dec. 30, 1952 |